United States Patent [19]

Poncet

[11] 4,106,885
[45] Aug. 15, 1978

[54] HYDRAULIC MOULDING PRESSES

[76] Inventor: Pierre Poncet, 12 bis, rue Trarieux, Lyons, France, 69003

[21] Appl. No.: 778,525

[22] Filed: Mar. 17, 1977

[30] Foreign Application Priority Data

Mar. 31, 1976 [FR] France ................................ 76 10352

[51] Int. Cl.² ............................................... B29F 1/06
[52] U.S. Cl. .............................. 425/450.1; 425/451.2; 425/451.9; 425/DIG. 221; 425/595
[58] Field of Search ............... 425/450.1, 451.9, 451.2, 425/589, 590, 595, DIG. 222, DIG. 223, DIG. 221

[56] References Cited

U.S. PATENT DOCUMENTS

| | | | |
|---|---|---|---|
| 2,976,569 | 3/1961 | Quere et al. ................. | 425/451.2 |
| 3,093,863 | 6/1963 | Ehlert ........................... | 425/451.2 |
| 3,433,290 | 3/1969 | Eggenberger et al. ....... | 425/590 X |
| 3,465,387 | 9/1969 | Allard et al. ................. | 425/DIG. 223 |
| 3,561,063 | 2/1971 | Sindelar et al. .............. | 425/DIG. 223 |
| 3,590,436 | 7/1971 | Akesson et al. ............. | 425/590 |
| 3,663,140 | 5/1972 | Hehl .............................. | 425/590 X |
| 3,669,599 | 6/1972 | Snider et al. ................. | 425/595 |
| 3,729,283 | 4/1973 | Eggenberger et al. ....... | 425/451.2 |
| 3,801,256 | 4/1974 | Farrell .......................... | 425/590 X |
| 3,951,579 | 4/1976 | Myers et al. ................. | 425/450.1 X |
| 4,021,181 | 5/1977 | Hehl .............................. | 425/450.1 |
| 4,025,266 | 5/1977 | Linde et al. .................. | 425/589 X |

*Primary Examiner*—J. Howard Flint, Jr.
*Attorney, Agent, or Firm*—Dowell & Dowell

[57] ABSTRACT

In a molding press having short-stroke high-power mold-clamping hydraulic rams (9) disposed around the free end of each of its guiding columns (3), the cylinder (21) of each of these rams is fixed to a platen (7) which is movable with respect to the columns (3), while its tubular piston rod (16) through which the corresponding column extends has at its free end a locking device (11) including semi-circular keys 12 which may be selectively engaged into one of a number of successive circular grooves (3b) formed in the column to lock rod (16) therewith. A second locking device (132) of quite similar construction is provided between cylinder (21) and platen (7) to selectively lock the latter with the column, the keys (112) of this second device cooperating with the same series of grooves (3b) as the first one. When the mold-clamping rams have effected their full stroke, if the latter is insufficient for the molding operation, (132) may be engaged to lock the movable platen, (11) disengaged to liberate rod (16), whereafter the ram may be contracted, (11) re-engaged, and (132) disengaged to permit another stroke of the ram and consequently a further advance of the movable platen (7).

4 Claims, 5 Drawing Figures

HYDRAULIC MOULDING PRESSES

The present invention relates to hydraulic molding presses of the kind in which the movable platen or platens is or are actuated by quick acting long stroke mold-preclosing rams of relatively low power and by short stroke mold-clamping rams which develop the high molding pressure required.

It has been proposed in such presses to construct the mold-clamping rams with annular form and to mount them concentrically on the free ends of the tie-rods or columns of the press. Each of these mold-clamping rams comprises a cylinder fixed to one of the platens of the press and a tubular rod which may be locked onto the corresponding column thereof. When the preclosing rams have effected their stroke, the tubular rods of the mold-clamping rams are locked onto the columns and these rams are actuated to generate the molding pressure required.

This arrangement is fully satisfactory in the case of injection molding wherein the stroke required from the mold-clamping rams only corresponds to the elongation of the tie rods or columns and to the slight deformation of the platens and of the mold parts under the effect of the stresses which result from the pressure generated by these rams. In the case of compression molding however the stroke required to force the material into all the cavities of the mold parts is considerably longer and therefore the mold-clamping rams must be relatively long, which increases the overall dimensions and the cost of the press.

It is the object of the present invention to avoid this disadvantage.

The present invention concerns a hydraulic molding press of the kind comprising long stroke mold-preclosing rams, short stroke mold-clamping rams each of which includes a cylinder fixed to one of the platens of the press and a tubular rod co-axial to one of the tie rods or columns of the press, and main locking devices each interposed between the tubular rod of one of the said mold-clamping rams and the corresponding tie rod or column of the press, wherein an auxiliary locking device is provided between the platen to which the cylinders of the said mold-clamping rams are fixed and each of the tie rods or columns of the press, in such manner that when the mold-clamping rams have effected their full stroke, the said auxiliary locking devices may be actuated to lock the said platen with the columns of the press, the main locking devices being disengaged from the columns, the mold-clamping rams contracted, the main locking devices re-actuated and the auxiliary locking devices disengaged from the columns to permit the mold-clamping rams to effect another mold-clamping stroke.

Thus a long compression stroke may be obtained by successive actuations of mold-clamping rams only having a relatively short stroke.

Figure 1:
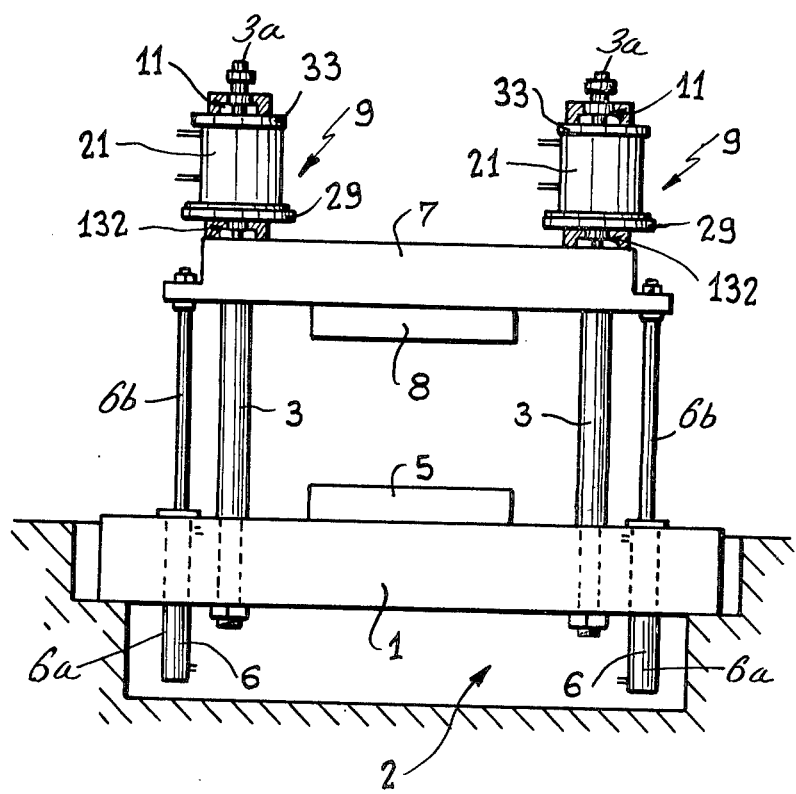
FIG. 1 is a front view of a press according to the invention.

The molding press illustrated in FIG. 1 comprises a fixed lower platen 1 disposed above a pit 2, a number of guiding columns 3 having their lower ends secured to the fixed platen 1, a movable platen 7 slidably carried by columns 3, long stroke mold-preclosing hydraulic rams 6 having their cylinders 6a secured to the fixed platen 1 and their rods 66 attached to the movable platen 7, and short stroke high-power mold-clamping rams 9 annularly disposed at the free upper ends 3a of columns 3 in the manner to be described. Reference numerals 5 and 8 designate the two parts of the mold.

Each mold-clamping ram 9 comprises a tubular rod 16 (FIGS. 2 to 5) which carries a piston 18 slidably movable in a cylinder 21 appropriately fixed to a plate 29 which is itself fixed to the movable platen 7, a locking device 132, or auxiliary locking device to be described later, being disposed between plate 29 and platen 7. This tubular rod 16 has an enlarged upwardly directed extension 16a which passes through the upper end of cylinder 21 and which carries an upper plate 33 on which another locking device or main locking device 11 is disposed.

The locking devices 11 and 132 are similar. Each includes a pair of semi-circular keys 12, respectively 112, which are movable perpendicularly to the plane of the drawing between lateral guides 13, respectively 113. At the first or disengaged position these keys are spaced from column 3 while at a second locking position they are engaged into one of a number of successive circular grooves 3b provided in the said column. Keys 12 and 112 are actuated by auxiliary hydraulic rams (not shown). Since such keys and their associated ram mechanisms are well known in the art, as shown for example in U.S. Pat. Nos. 3,669,599 and 3,951,579, no further description is required. For a clearer understanding, in FIGS. 2 to 5 keys 12, 112 have been cross-hatched when they are at their second position, although at this position their plane of contact with each other is in coincidence with the plane of the drawing.

As shown, the ram formed of cylinder 21 and of piston 18 is double-acting in this sense that oil under pressure may be supplied to cylinder 21 either below piston 18, or above the latter, as illustrated by pipes 30 and 31.

Figure 2:
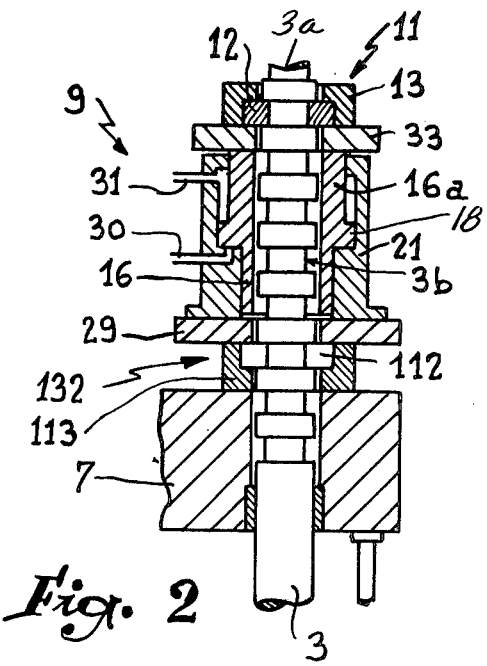
FIGS. 2 to 5 are longitudinal sections of a mold-clamping ram and of the related parts of the press, these views corresponding respectively to successive steps of an operating cycle of the ram.
Figure 3:
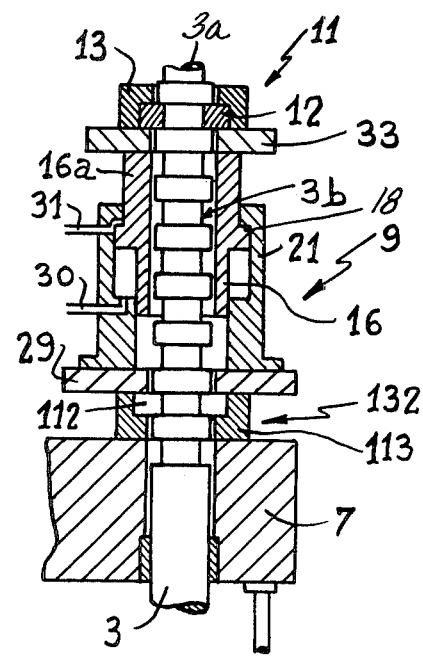
Figure 4:
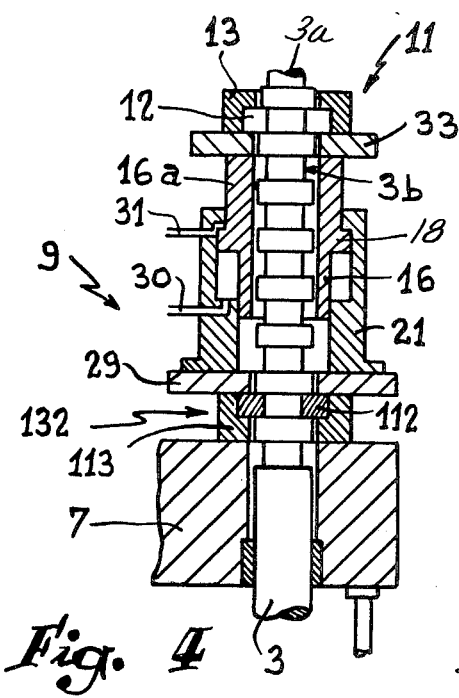
Figure 5:
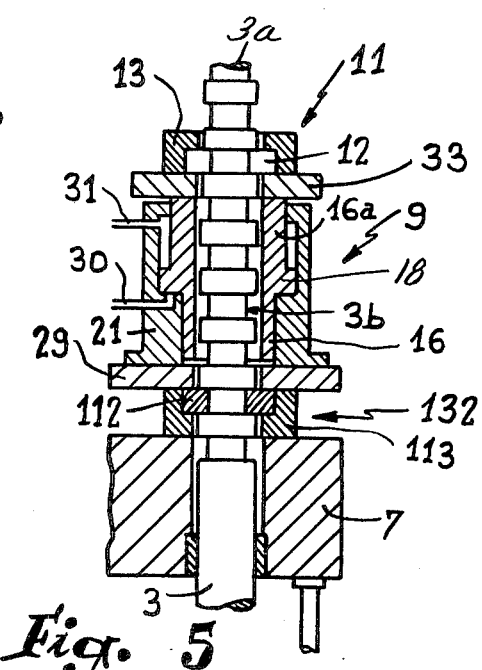

The operation is as follows:

Keys 12 and 112 being at their disengaged position, preclosing rams 6 are actuated to bring the mold parts 5 and 8 as close to each other as possible. In the case of injection molding this means that the mold parts are in contact under slight pressure. In the case of compression molding, the material to be molded begins to be compressed between the mold parts, but under a quite insufficient pressure. Then the semi-circular keys 12 are actuated and brought to their locking position, as shown in FIG. 2. The tubular rod 16 of each mold-clamping ram 11 together with its piston 18 is therefore locked axially onto the grooved column 3. Oil under pressure is then supplied to the lower end of cylinder 21 through pipe 30, pipe 31 being connected with the oil sump. Cylinder 21 is thus displaced downwardly to realize the mold-clamping or compression molding step.

In the case of injection molding the stroke of rams 9 only corresponds to the elongation of columns 3 under the effect of the pressure which these rams apply to the movable platen 7 and to the deformation of platen 1, 7 and of the mold parts 5, 8. But in the case of compression molding, this stroke should be sufficient for causing the material to fill all the cavities provided in the mold parts. It may therefore occur that when rams 9 have effected their full possible stroke (position of FIG. 3), the molding step is not fully effected. The semi-circular keys 112 may then be actuated to lock in each ram 9 plate 29 and cylinder 21 with the corresponding column 3 (position of FIG. 4), which of course also locks the movable platen 7 with the columns. When this is done keys 12 may be disengaged from the said columns and rams 9 may be returned to their initial position by connecting their pipes 31 with the pressurized oil source and their pipes 30 with the oil sump (position of FIG. 5). Keys 12 are then returned to their locking position, keys 112 are thereafter disengaged and rams 9 may effect a further compressing stroke. The operation may be repeated several times, if necessary.

By alternate actuation of the main locking device 11 and of the auxiliary locking device 132 it is thus possible to obtain for the mold parts 5 and 8 a relatively long compression stroke even with rams 9 having a relatively short individual stroke.

While the main and auxiliary locking devices have been described as including transversely movable keys adapted to be engaged into grooves formed in the columns, it is obvious that other equivalent systems could be used. More particularly the locking effect could be obtained frictionally, as for instance by means of brake members applied against the columns under sufficient pressure.

I claim:

1. A press for supporting and closing mating mold portions, comprising:

a first platen for supporting a first mold portion;

multiple columns fixed to said first platen and extending therefrom in parallel relationship, each of said columns having a free end and having multiple annular grooves near the free end and spaced axially of the column;

a second platen for supporting a second mold portion, the second platen having multiple holes through it receiving said columns, and the second platen being reciprocable on said columns with respect to said first platen;

long stroke mold pre-closing rams connected between said first and second platens and operative when pressurized to displace the second platen on said columns with respect to the first platen;

a short stroke mold-clamping ram at each column, each short stroke ram comprising a cylinder containing a reciprocable piston, the piston being tubular and having the free end of an associated column extending through it, and the cylinder being connected to the second platen; and a main locking means carried by the piston at each column and operable, when the long stroke rams have pre-closed the mold portions, to enter a groove and lock the piston to the column, whereby pressurizing of the cylinder will exert a mold closing stroke in a direction to displace the cylinder and connected platen to mate the mold portions.

2. A press for supporting and closing mating mold portions, comprising:

a first platen for supporting a first mold portion;

multiple columns fixed to said first platen and extending therefrom in parallel relationship, each of said columns having a free end and having multiple annular grooves near the free end and spaced axially of the column;

a second platen for supporting a second mold portion, the second platen having multiple holes through it receiving said columns, and the second platen being reciprocable on said columns with respect to said first platen;

long stroke mold pre-closing rams connected between said first and second platens and operative when pressurized to displace the second platen on said columns with respect to the first platen;

a short stroke double-acting mold clamping ram at each column, each short stroke ram comprising a cylinder containing a reciprocable piston, the piston being tubular and having the free end of an associated column extending through it, and the cylinder being connected to the second platen;

a main locking means carried by the piston at each column and selectively operable, when the long stroke rams have pre-closed the mold portions, to enter a groove and lock the piston to the column, whereby the cylinder can be pressurized to exert a mold closing stroke in a direction to displace the cylinder and connected platen to more closely mate the mold portions; and an auxiliary locking means at each column connected with the second platen and selectively operable, when the cylinder and platen have been fully displaced with respect to the piston, to enter another groove and lock the cylinder and platen to the column, whereby to maintain the degree of closing of the mold portions while the main locking means is released and the cylinder pressurized in the opposite direction to displace the piston outwardly along the column in preparation for a subsequent mold-closing stroke of said short stroke ram.

3. In a press as set forth in claim 2, said multiple columns extending through the second platen and therebeyond when the long-stroke rams are fully extended.

4. In a press as set forth in claim 2, the stroke of the piston within the cylinder being equal to the spacing between similar points on adjacent annular grooves as measured axially of a column.

* * * * *